United States Patent [19]

Rodloff et al.

[11] Patent Number: 4,657,391
[45] Date of Patent: Apr. 14, 1987

[54] RING LASER, PARTICULARLY FOR A RING LASER TYPE OF GYRO

[75] Inventors: Rüdiger K. Rodloff, Meinersen; Werner W. Jungbluth, Königslutter, both of Fed. Rep. of Germany

[73] Assignee: Deutsche Forschungs- und Versuchsanstalt für Luft- und Raumfahrt e.V., Cologne, Fed. Rep. of Germany

[21] Appl. No.: 717,395

[22] Filed: Mar. 29, 1985

[30] Foreign Application Priority Data

Mar. 31, 1984 [DE] Fed. Rep. of Germany ....... 3412016

[51] Int. Cl.$^4$ .................... G01C 19/64; H01S 3/083
[52] U.S. Cl. ...................................... 356/350; 372/94
[58] Field of Search ................ 356/350; 372/31, 94, 372/97, 107

[56] References Cited

U.S. PATENT DOCUMENTS 4,386,853 6/1983 Ljung .................................. 356/350
4,432,646 2/1984 Rodloff et al. ....................... 356/350

FOREIGN PATENT DOCUMENTS 2920429 11/1979 Fed. Rep. of Germany ...... 356/350
1252952 11/1971 United Kingdom ................ 356/350

Primary Examiner—Davis L. Willis
Assistant Examiner—S. A. Turner
Attorney, Agent, or Firm—Gottlieb, Rackman & Reisman

[57] ABSTRACT

A ring laser particularly for a ring laser type of gyro in which the ring laser includes three corner mirrors and a separate gas discharge tube arranged in a recess in a block. The gas discharge tube is mounted on the block longitudinally of the beam path by at least one piezo electric drive. The modulation amplitude of the separated beam portion is measured by a control circuit and is converted into a high voltage adjustment signal for the drive as a function of the modulation amplitude. Two drives may be spaced apart in the longitudinal direction of the gas discharge tube and these can be controlled independently of each other. Although the beam path may be displaced as a result of thermal expansion and/or bending of the block, the gas discharge tube may be kept exactly coaxial with the beam which traverses it.

5 Claims, 4 Drawing Figures

RING LASER, PARTICULARLY FOR A RING LASER TYPE OF GYRO

FIELD OF THE INVENTION

The invention relates to a ring laser, particularly for a ring laser type of gyro, the ring laser being of a type including a thermally and mechanically highly-stable block having three corner mirrors, of which at least one is adjustable and of which one is a partially transparent mirror behind which at least one photo-detector is arranged in the beam path of the separated beam portion of one of the rotating wave trains, and further including a gas discharge tube, being the optical amplifier medium, arranged in an aperture in the block.

DESCRIPTION OF THE PRIOR ART

The scale factor of a laser type of gyro is $$\frac{4F}{L \cdot \lambda}$$

and is therefore dependent on the geometric dimensions: F=ring laser area and L=length of resonator cavity.

The principal influence on the scale factor is the length of the resonator cavity as a function of the wavelength $\lambda$ and to maintain the length of the resonator cavity it is usual to provide one of the corner mirrors with a driving means with which a translational movement is given to this mirror perpendicular to the mirror plane and/or in the direction of the mirror axis, where the mirror is a concave mirror. In a known ring laser the beam intensities of the separated beam portions of both rotating wave trains are each measured with a photo-detector. The output signals of the photo-detectors are added together and depending on the sum signal a high voltage amplifier is controlled, from which an adjustment signal is fed to said driving means designed as a piezo electric drive (DE-OS No. 30 09 796=G.B. No. 2071905=U.S. Pat. No. 4,432,646; U.S. Pat. No. 3,581,227).

In order to minimize dimensional alterations as far as possible, the block of a ring laser is generally produced from a thermally and mechanically highly-stable ceramic glass. In spite of the small thermal expansion coefficient, the block is deformed by temperature changes. The operational values of the ring laser are thereby altered. This leads among other things to an angular displacement of the mirrors and therefore to a displacement of the beam path. Such an angular displacement of the mirror can be compensated by a parallel adjustment of the mirror. A different beam path then results, for which the length of the resonator cavity is then to be adjusted.

It is known, in order to compensate said displacement of the beam path in the plane of the beam of a ring laser, to arrange one of the mirrors in such a way as to allow its parallel displacement and also so that it is tiltable about an axis perpendicular to the plane of the beam. The position of this mirror is thereby controlled via a circuit in which the intensity of the separated beam portion of one of the rotating wave trains is measured and is used as the input signal for a control circuit. From this signal an adjustment signal for the piezo electric drive of the adjustable mirror is determined whereby separate reference signals are used (U.S. Pat. No. 4,113,387).

All known ring lasers neglect the fact that the optimal resonator cavity length is restored by mirror adjustment, but that the resulting new beam path no longer optimally traverses the laser medium, in this case the gas discharge tube. The achievable power of the ring laser is therefore reduced.

An object of the invention is to design a ring laser of the aforesaid type in such a way that even in the case of displacement of the beam path by adjustment of the length of the resonator cavity an optimal power output is given by the laser medium.

SUMMARY OF THE INVENTION

This problem is solved according to the invention in that the gas discharge tube is mounted on the block for adjustment radially with respect to the plane of the beam path by means of at least one piezo electric drive means, and in that a control circuit is provided by which the modulation amplitude of the separated beam portion is measured and is converted into a high voltage adjustment signal for the piezo electric drive as a function of the modulation amplitude.

As a result of the solution, according to the invention, of the stated problem it is not only an adaption of the position of the gas discharge tube to the respective beam path which is achieved. Thermal expansion of the gas discharge tube itself can also be compensated in a simple manner, with the result that the possibility exists of using standard instrument glass gas discharge tubes without a loss in quality of the performance of the ring laser and therefore of securing considerable advantages from the point of view of production technology and therefore of reducing considerably the cost of manufacturing a ring laser. The crucial disadvantage of utilizing gas discharge tubes made from conventional instrument glass, namely the high coefficient of thermal expansion of conventional instrument glass, can be overcome in a simple manner.

The gas discharge tube is preferably also angularly adjustable with respect to the plane of the beam path.

Two piezo electric drives spaced apart in the longitudinal direction of the gas discharge tube may be provided. Both drives may be controllable independently.

BRIEF DESCRIPTION OF THE DRAWINGS

The invention is illustrated by way of example in the drawings and is subsequently described in detail with the aid of the drawings, in which.

DESCRIPTION OF THE PREFERRED EMBODIMENTS

Figure 1:
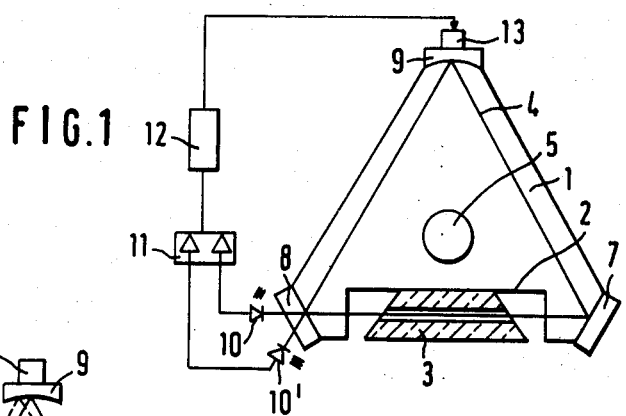
FIG. 1 shows schematically a known ring laser having an adjustable corner mirror and a control for the compensation of changes in the length of the resonator cavity.

FIG. 1 shows a known ring laser having a block 1 which is composed, as is usual of a thermally and mechanically highly-stable ceramic glass. The block 1 is provided on one side with an aperture or a recess 2 in which there is mounted a separate He-Ne gas discharge tube 3, made of standard instrument glass. The beam path 4 is represented by continuous lines. The beam path axially traverses the gas discharge tube 3. For application as a ring laser type of gyro, the block 1 can be provided with a standard dither means 3.

The block is provided with three corner mirrors 7, 8 and 9, of which the corner mirror 9 is a concave mirror. The mirror 8 is partially transparent. Beam portions of the counter-rotating wave trains are separated via mirror 8. Photo-diodes 10 and 10' are fed with these beam portions. Their output signals are fed to an adder 11. The output signal from the adder 11 is transmitted to a high voltage amplifier 12. The output from the amplifier 12 is used as an adjustment signal for a piezo drive 13, normally a piezo electric stack drive, by which the concave mirror 9 can undergo parallel displacement.

Figure 2:
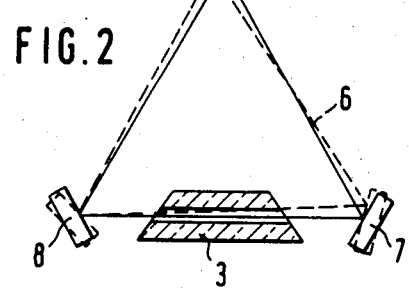
FIG. 2 shows schematically a beam misalignment as a result of a compensation of the length of the resonator cavity via a translational movement of one of the corner mirrors.

In FIG. 2 it is assumed that the corner mirrors 7 and 8 have been displaced from their initial positions, represented by continuous lines, as a result of deformation of the block 1. A resultant alteration in the length of the resonator cavity is compensated by a translational movement of the mirror 9 by means of the drive 13. The result is the beam path 6 represented by broken lines. As a result of this beam misalignment, which is shown exaggerated for illustration only, there also follows an angular misalignment of the path of the beam through the gas discharge tube 3, with the result that optimal power output is no longer given by this.

Figure 3:
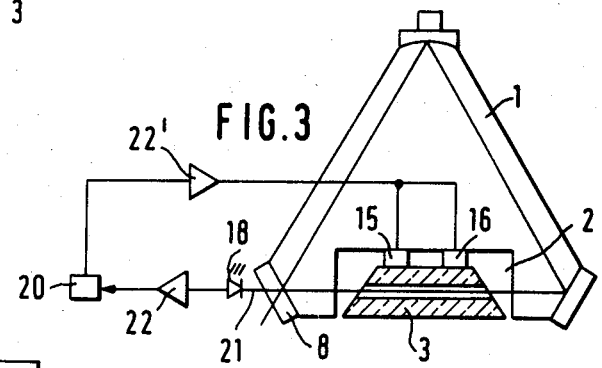
FIG. 3 shows a first embodiment of a ring laser according to the invention.

To eliminate these disadvantages, the gas discharge tube 3 accommodated in the recess 2 of the block 1 is, according to the invention, mounted on the block 1 by two piezo ceramic drives 15, 16 spaced apart, as is shown in FIG. 3. These drives 15, 16 are connected in parallel in the embodiment according to FIG. 3. The portion 21 of the beam separated via the mirror 8 of the clockwise —cw—rotating wave train strikes a photo-diode 18. The output signal from this is amplified in an amplifier 22 and is fed to a control circuit 20 in which the modulation amplitude is measured and is converted into a regulated signal for the piezo drives 15, 16. This control circuit can be a known control circuit, as for example, is known from GB No. 1,534,998.

The regulated signal is fed in conventional manner to a high voltage amplifier 22' which provides the final adjustment signal for the drives 15 and 16.

A control circuit, as is shown in FIG. 3, makes possible in a simple manner a compensation of the radial thermal expansion of the gas discharge tube 3 through a radial parallel displacement of the gas discharge tube 3 depending on the thermal expansion. This makes it possible therefore to ensure a highly accurate alignment of the gas discharge tube 3 to the beam path, irrespective of the various thermal expansion coefficients of the material from which the block 1 is made and of the glass from which the gas discharge tube is made.

Figure 4:
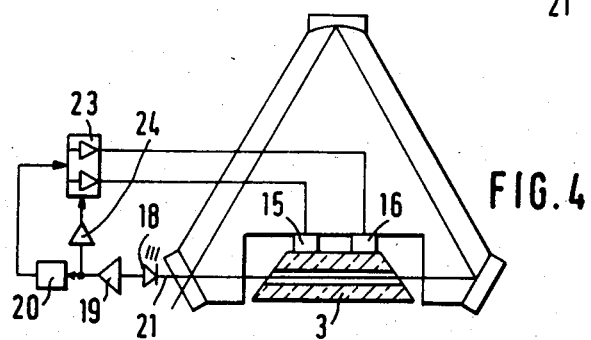
FIG. 4 shows a further embodiment of a ring laser according to the invention.

In the embodiment according to FIG. 4, in which similar components also referred to in the description of the embodiment according to FIG. 3 are provided with the same reference numbers, both drives 15 and 16 for the gas discharge tube 3 are separately controllable. An angular adjustment of the longitudinal axis of the tube in the plane of the beam path is thereby possible together with a parallel displacement. The amplified output signal of the photo-detector 18 is fed via an amplifier 19 to a control circuit 20 by which the modulation amplitude is measured and is converted into a first regulated signal for the drives 15, 16. The regulated signal is fed to a control circuit 23 in which are arranged two separately controllable high voltage amplifiers. In the case of equal control of the high voltage amplifiers a parallel displacement of the tube 3 takes place. Via a switching logic the two high voltage amplifiers are controllable in turn. This switching logic can be controllable via a control circuit 24 for optimization of the laser power output, as is schematically represented in FIG. 4. By means of such a control circuit, the position of the gas discharge tube 3 can be optimally adjusted both radially and angularly relative to the actual beam path between the mirrors 7 and 8.

What we claim is:

1. A ring laser including a thermally and mechanically highly stable block; three corner mirrors on said block, at least one of said mirrors being adjustable and one of said mirrors being a partially transparent separating mirror; at least one photo-detector arranged behind said partially transparent separating mirror in the beam path of the separated beam portion of a rotating wave train; a gas discharge tube, constituting the optical amplifier medium, arranged in an aperture at one side of said block and longitudinally of the beam path on that side, said gas discharge tube being movable relative to said block for adjustment radially with respect to the plane of said beam path; at least one piezo electric drive interconnecting said gas discharge tube and said block for effecting the movements of said gas discharge tube relative to said block; and a control circuit connected with said at least one photo-detector and said at least one piezo electric drive, said at least one photo-detector sensing the modulation amplitude of the separated beam portion and providing a corresponding input signal to said control circuit, and said control circuit converting said input signal into a high voltage adjustment signal for said at least one piezo electric drive as a function of the modulation amplitude.

2. A ring laser according to claim 1, said gas discharge tube being further movable, relative to said block and in the plane of the beam path, angularly with respect to the beam path on said one side of said block.

3. A ring laser according to claim 1 or 2, in which said at least one piezo electric drive comprises a piezo electric stack drive.

4. A ring laser according to claim 2, in which two piezo electric drives are interconnected with said block and said gas discharge tube and are spaced apart from each other in the longitudinal direction of said gas discharge tube.

5. A ring laser according to claim 4, in which said control circuit is connected separately with each of said piezo electric drives for rendering the latter controllable independently.

* * * * *